United States Patent
Shantz et al.

(10) Patent No.: US 8,801,079 B2
(45) Date of Patent: Aug. 12, 2014

(54) LOAD ACTUATED BAFFLE

(71) Applicant: Zephyros, Inc., Romeo, MI (US)

(72) Inventors: Jeffery Thomas Shantz, Metamora, MI (US); Alexander Gabriel Mangiapane, Macomb Township, MI (US); Henry E. Richardson, Washington, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/795,849

(22) Filed: Mar. 12, 2013

(65) Prior Publication Data

US 2013/0241226 A1 Sep. 19, 2013

Related U.S. Application Data

(60) Provisional application No. 61/616,143, filed on Mar. 27, 2012, provisional application No. 61/610,289, filed on Mar. 13, 2012.

(51) Int. Cl.
*B60J 7/00* (2006.01)
*B22F 3/00* (2006.01)
*B22F 7/00* (2006.01)

(52) U.S. Cl.
CPC *B22F 3/004* (2013.01); *B22F 7/006* (2013.01)
USPC .................................... 296/187.02

(58) Field of Classification Search
CPC .. B22F 2998/10; B22F 2999/10; B22F 3/004; B22F 7/006; C04B 30/02; B23B 27/145; B29C 65/00; A63H 5/00
USPC .................................... 296/187.02
See application file for complete search history.

(56) References Cited

U.S. PATENT DOCUMENTS

| | | | |
|---|---|---|---|
| 6,575,526 B2 * | 6/2003 | Czaplicki et al. | 296/187.02 |
| 7,025,409 B2 * | 4/2006 | Riley et al. | 296/187.03 |
| 7,125,461 B2 | 10/2006 | Czaplicki et al. | |
| 7,199,165 B2 | 4/2007 | Kassa et al. | |
| 7,313,865 B2 | 1/2008 | Czaplicki et al. | |
| 7,641,264 B2 * | 1/2010 | Niezur et al. | 296/187.02 |
| 7,735,906 B2 * | 6/2010 | Takahashi et al. | 296/193.06 |
| 7,841,647 B2 * | 11/2010 | Niezur et al. | 296/187.05 |
| 8,028,799 B2 | 10/2011 | Hasler | |
| 8,079,442 B2 | 12/2011 | Wojtowicki | |
| 8,087,916 B2 | 1/2012 | Kanie et al. | |
| 8,293,360 B2 | 10/2012 | Cousin et al. | |
| 8,348,581 B2 * | 1/2013 | Niezur et al. | 411/508 |
| 8,388,037 B2 | 3/2013 | LaNore et al. | |

(Continued)

FOREIGN PATENT DOCUMENTS

| | | |
|---|---|---|
| DE | 102005003978 A1 | 8/2006 |
| DE | 102011014454 A1 | 11/2011 |

(Continued)

OTHER PUBLICATIONS

PCT Written Opinion & Search Report dated May 21, 2013; Appln. No. PCT/US2013/030414.

*Primary Examiner* — Kiran B Patel
(74) *Attorney, Agent, or Firm* — The Dobrusin Law Firm, PC

(57) ABSTRACT

A device for reinforcing, baffling or sealing a vehicle structure that includes hinge structures for allowing the member to be moveable within a cavity and free of any spring effect during movement.

20 Claims, 1 Drawing Sheet

(56) References Cited

U.S. PATENT DOCUMENTS

| | | | |
|---|---|---|---|
| 8,430,448 B2 * | 4/2013 | Richardson et al. | 296/187.02 |
| 8,444,214 B2 | 5/2013 | Helferty | |
| 8,469,143 B2 | 6/2013 | Prunarety et al. | |
| 2004/0011282 A1 | 1/2004 | Myers et al. | |
| 2004/0212220 A1 * | 10/2004 | Riley et al. | 296/187.03 |
| 2005/0040671 A1 * | 2/2005 | Barz | 296/187.02 |
| 2005/0218697 A1 * | 10/2005 | Barz et al. | 296/187.02 |
| 2006/0073266 A1 | 4/2006 | Myers et al. | |
| 2007/0075569 A1 * | 4/2007 | Barz et al. | 296/203.02 |
| 2009/0102233 A1 * | 4/2009 | Tomozawa | 296/187.02 |
| 2009/0111371 A1 | 4/2009 | Niezur et al. | |
| 2009/0167055 A1 * | 7/2009 | Niezur et al. | 296/187.02 |
| 2010/0021267 A1 | 1/2010 | Nitsche | |
| 2010/0320028 A1 | 12/2010 | Wojtowicki | |
| 2011/0057392 A1 | 3/2011 | Monnet et al. | |
| 2011/0192675 A1 | 8/2011 | Lecroart et al. | |
| 2012/0207986 A1 | 8/2012 | Belpaire et al. | |
| 2013/0087406 A1 | 4/2013 | Franey | |
| 2013/0140731 A1 | 6/2013 | Belpaire | |
| 2013/0181470 A1 | 7/2013 | LaNore et al. | |

FOREIGN PATENT DOCUMENTS

| | | |
|---|---|---|
| EP | 1666228 A2 | 6/2006 |
| EP | 2176113 B1 | 4/2011 |
| EP | 1534561 B1 | 8/2013 |
| EP | 2262633 B1 | 9/2013 |
| WO | 01/34453 A1 | 5/2001 |
| WO | 2011/134943 A1 | 11/2011 |
| WO | 2011/147872 A1 | 12/2011 |

* cited by examiner

LOAD ACTUATED BAFFLE

TECHNICAL FIELD

The present invention relates generally to a baffling, sealing, or reinforcement member that includes hinge structure for allowing the member to be moveable within a cavity and free of any spring effect during movement.

BACKGROUND

The transportation industry continues to require methods of baffling, reinforcement and sealing that provide improved functionality while simultaneously providing reduced weight and cost. Often, the assemblies utilized will be required to move during the installation and manufacturing process. As a result, efforts have been made to produce parts that are movable, any such parts are formed to move but fail to return to the desired location within a cavity. There is thus a need in the art of sealing for parts that are both movable and yet formed to re-locate to a specific location after movement.

SUMMARY OF THE INVENTION

The present teachings meet the aforementioned inert by providing in a first aspect, a method for baffling, reinforcing or sealing of a cavity of a vehicle comprising providing a pre-formed insert. The insert may include a first pre-installation configuration including a carrier structure and an expandable material supported on the carrier structure. The insert may also include a plurality of living hinges, each hinge configured for enabling local elastic deformation of the insert in a respective pre-determined direction. The insert may also include an attachment portion and at least one contact surface located external of the expandable material for defining a generally low-friction surface as compared with the expandable material and formed for spacing the expandable material from an opposing surface during subsequent installation steps. The insert may then be attached to a first substrate. A second substrate may then be attached to the first substrate in overlying relationship with the first substrate for defining a cavity with the insert there between while elastically deforming each of the living hinges of the insert in their respective pre-determined directions so that the insert assumes a second installed configuration different from the first pre-installation configuration. The expandable material may then be activated while the insert is in the second installed configuration for causing it to foam and fill the cavity.

During the step of activating, the foam may bond to each of the first and second substrates. The insert and expandable material may provide baffling for the cavity. The insert and expandable material may provide structural reinforcement for the cavity. The method may be free of any step where the pre-formed insert returns to the first pre-installation configuration after attachment of the second substrate. One or more of the plurality of living hinges may be substantially free of any metallic component. One of the first substrate or second substrate may be in line contact with the contact surface. One of the first substrate or second substrate may be in point contact with the contact surface. One of the first substrate or second substrate may be in area contact with the contact surface. The contact surface may be a structure that is sufficiently resilient that it will resist read-through through the outer surface of the second substrate subsequent to assembly. The pre-formed insert may include at least hinges. The carrier may be defined to include a loop. At least one living hinge may open and at least one living hinge may close. The pre-installation configuration may enable clearance for installation of the second substrate so that the second substrate contacts the contact surface prior to contacting any other portion of the insert. A single point of contact may cause multiple degrees of movement of the plurality of living hinges. The insert may form into the second installed configuration as a result of the first and second surface being brought into contact with one another. The plurality of living hinges may be free of hinges that extend beyond 180°.

The present teachings provide for a movable carrier having a plurality of installation positions such that the carrier moves upon connecting a first and second surface to form a cavity about the carrier. Such movement facilitated by a plurality of living hinges.

DETAILED DESCRIPTION

Figure 3:
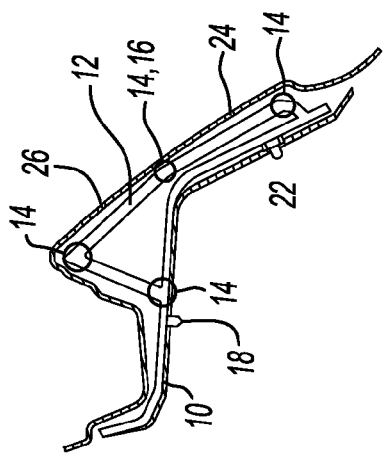
FIG. 3 shows a perspective view of the hinge of FIG. 2 show as the hinge is moved to a closed position.

The explanations an illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the priority date of U.S. Provisional Application Ser. Nos. 61/616,143, filed on Mar. 27, 2012, and 61/610,289, filed on Mar. 13, 2012. The entirety of these applications is hereby incorporated by reference for all purposes.

The baffle structure of the present teachings may include a carrier having one or more living hinges. The living hinges facilitate movement of at least a portion of the baffle as the shape of a cavity which the baffle is located changes during a manufacturing process. Thus, as the shape of the cavity changes, the shape of the baffle also changes to conform more precisely with the shape of the cavity. One or more hinges may include a contact surface. The contact surface may contact a wall of the cavity. The contact surface may contact a cavity wall that moves during a manufacturing process so that the movement of the cavity wall causes movement of the carrier due to the contact between the contact surface and cavity wall. The hinge including the contact surface may be the only hinge. Alternatively, the movement of the hinge including the contact surface may cause movement of one or more additional hinges.

The baffle structure may be formed in an injection molding process, which may be a two-shot injection molding process that includes a first carrier material and a second expandable material. The carrier material may include a variety of materials such as polymers, elastomers, fibrous materials (e.g., cloth or woven materials), thermoplastics, plastics, nylon, and combinations thereof. The carrier material may be fabricated from a common sheet of material to help avoid waste. The carrier material may be flexible to allow for bending of the structure to fit within desired small spaces of a cavity. As a result, during movement of any living hinge, the carrier and expandable material will also move and may therefore be formed of materials providing sufficient elasticity to allow for the requisite movement. Alternatively, the hinge portion may be substantially free of any expandable material so that only the carrier material must allow for movement.

After placement of the baffle structure into a cavity, the expandable material may expand according to a predetermined set of conditions. For example, exposure to certain levels of heat may cause the expandable material to expand. The volumetric expansion of the expandable material may vary depending upon the sealing and/or baffling needs of a particular cavity. The expandable material layer may expand at least about 100%. The expandable material may expand less than about 2000%. The expandable material may expand at least about 500%, at least about 1000%, or more. The expandable material may expand less than about 1000% or even less than about 500%. Such expansion may occur after any cavity movement that occurs during the manufacturing process. Such expansion may occur after the carrier is moved into a second installation position.

The expandable material may be generally dry to the touch or tacky and may be shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. The expandable material may be a relatively high expansion foam having a polymeric formulation that includes one or more of an epoxy resin, an acetate (e.g. ethylene vinyl acetate) a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the expandable material may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104. The expandable material may be die cut extruded sheets of material. It may be co-extruded with the material for forming the carrier. It may injection molded with the carrier material in a two-shot injection molding process. One or more of the living hinges may include expandable material. Alternatively, one or more of the living hinges may be substantially free of any expandable material.

A number of baffling or sealing foams may also be use for the expandable material. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the expandable material is usually initially processed as a floe able material before curing, and upon curing, the material will typically cross-link making the material incapable of further flow. Curing of the expandable material may also limit the ability of any living hinge including the expandable material to move. Thus, any movement of the baffle within a cavity may occur prior to any curing of the expandable material.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The contact surface may be integrally formed of one or more of the carrier material and the expandable material. The contact surface may include portions of both the carrier material and the expandable material. The contact surface may be formed of a material that permits the contact surface to slide along the surface of a cavity wall during movement of the cavity wall. In the event that the contact surface includes any expandable material, any desired movement of the contact surface along a cavity wall may occur prior to expansion and cure of the expandable material, as such expansion and cure may prevent the contact surface from sliding along a cavity wall.

The baffle may include one or more fastening device. These devices may be formed for fastening the baffle to a cavity wall. These devices may be formed for fastening the expandable material to the carrier. Such fastening devices may be formed as a tree-fastener or a threaded screw fastener. The fastening device may also be provided in a variety of shapes and in a variety of configurations so long as it can secure the baffle to a cavity. One example of a suitable fastener is disclosed in U.S. Publication No. 2010/0021267 incorporated by reference herein for all purposes. Examples of suitable fasteners include mechanical fasteners, clips, tabs, press-fits, snap-fits, screws, hooks, combinations thereof or the like. Fastening devices for attaching the expandable material to the carrier may include slots, troughs, extension members, or any other shape that may be formed in or attached to the carrier for receiving or connecting to the expandable material. Furthermore, it is contemplated that the any fastening device may be formed integral of a singular material with the material of the baffle structure or may be formed of a different material and may be removably attached to the carrier material. The fastening device may be provided as a magnetic material or an adhesive material that can attach (e.g., adhere or magnetically secure) the baffle structure to a cavity.

The baffle structure of the present invention may be installed into an automotive vehicle although it may be employed for other articles of manufacture such as boats, buildings, furniture, storage containers or the like. The baffle structure may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Formation of the materials of the present invention may include a variety of processing steps depending on the desired configuration of the materials. Moreover, various processes such as molding (e.g., compression, injection or other molding), extrusion or the like may be used to form a carrier material and an expandable material individually and such processes may be employed to attach these materials together.

Figure 1:
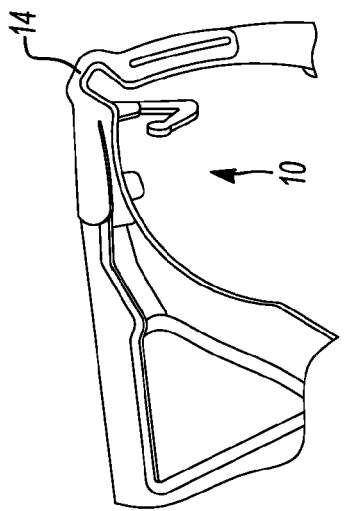
FIG. 1 shows a perspective view of an illustrative example of carrier of the present teachings.
Figure 2:
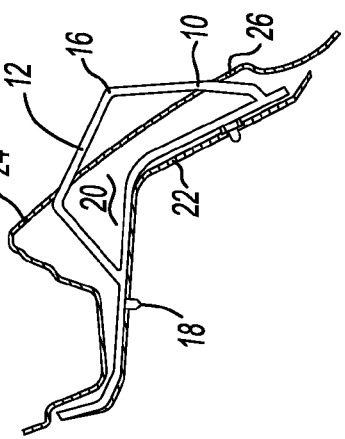
FIG. 2 shows a magnified view of hinge of an illustrative example of a baffle structure of the present teachings.

As shown for example in FIG. 1, the baffle structure (e.g., the pre-formed insert) includes a peripheral portion (e.g., a carrier) 12 and a plurality of living hinges 14 located about the peripheral portion. The carrier also includes a skid plate (e.g., a contact surface) 16 for contacting a surface of a cavity and preventing adhesion to the cavity and allowing the contact surface to slide along the cavity wall during movement of the cavity. As shown in FIG. 2, the baffle structure 10, includes carrier 12 with expandable material 13 located thereon. A living hinge 14 may be formed by the carrier and the expandable material. The living hinge 14 may close, as shown for example in FIG. 3.

Figure 4B:
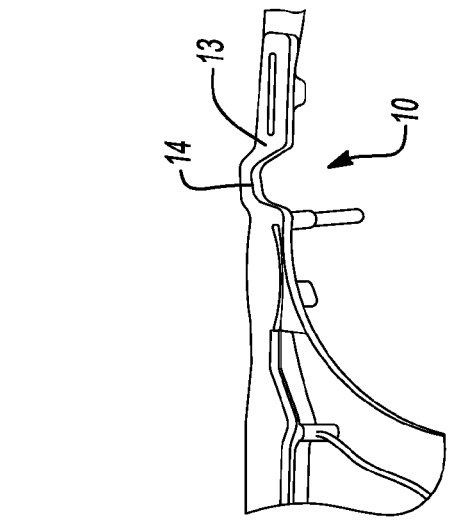
FIG. 4B shows a cross-sectional view of the structure of FIG. 1 shown during movement of the cavity during a manufacturing process.
Figure 4A:
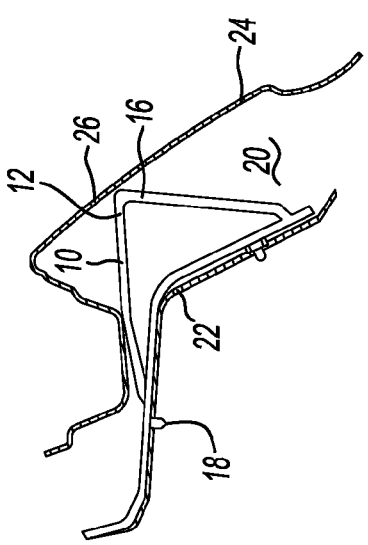
FIG. 4A shows a cross-sectional view of the structure of FIG. 1 shown upon initial placement of the structure within a cavity.
Figure 4C:
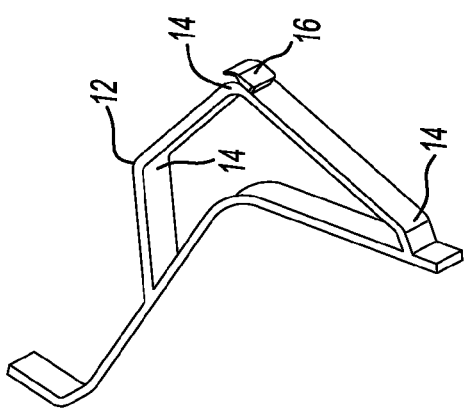
FIG. 4C shows a cross-sectional view of the structure of FIG. 1 shown after movement of the cavity during a manufacturing process.

As shown in FIGS. 4A-C, the baffle structure 10 and carrier 12 are moveable during shape change of the cavity 20. The living hinges 14 allow for flexing of the structure during movement, but also substantially prevent any spring back motion from occurring, thereby reducing the opportunity for the structure to settle in an undesired location. As shown, the location of the contact surface 16 moves as the shape of the cavity moves, thus allowing the shape of the structure 10 to move in conjunction with the cavity. The cavity 20 may be formed by a first substrate 22 and a second substrate 24 being brought into contact with one another. The insert 10 may be located into contact with the first substrate 22 in a first preinstallation configuration. Upon moving the second substrate 24 into a desired location, a first wall 26 of the second substrate 24 may contact the contact surface 16 and move the insert 10 into a second installed configuration as shown. The baffle structure may further include a fastening means (e.g., an attachment portion) 18 for fastening the structure to a cavity wall.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended alms along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method for baffling, reinforcing or sealing of a cavity of a vehicle comprising:
   providing a pre-formed insert, the insert including:
   i. a first pre-installation configuration including a carrier structure and an expandable material supported on the carrier structure;
   ii. a plurality of living hinges, each hinge configured for enabling local elastic deformation of the insert in a respective pre-determined direction;
   iii. an attachment portion;
   iv. at least one contact surface located external of the expandable material for defining a generally low-friction surface as compared with the expandable material and formed for spacing the expandable material from an opposing surface during subsequent installation steps;
   attaching the pre-formed insert to a first substrate;
   attaching a second substrate to the first substrate in overlying relationship with the first substrate for defining a cavity with the insert there between while elastically deforming each of the living hinges of the insert in their respective pre-determined directions so that the insert assumes a second installed configuration different from the first pre-installation configuration;
   activating the expandable material while the insert is in the second installed configuration for causing it to foam and fill the cavity.

2. The method of claim 1, wherein during the step of activating the foamed expandable material bonds to each of the first and second substrates.

3. The method of claim 1, wherein the insert and the expandable material provide baffling for the cavity.

4. The method of claim 1, wherein the insert and the expandable material provide structural reinforcement for the cavity.

5. The method of claim 1, wherein the method is free of any step where the pre-formed insert returns to the first pre-installation configuration after attachment of the second substrate.

6. The method of claim 1, wherein one or more of the plurality of living hinges are substantially free of any metallic component.

7. The method of claim 1, wherein one of the first substrate or second substrate is in line contact with the contact surface.

8. The method of claim 1, wherein one of the first substrate or second substrate is in point contact with the contact surface.

9. The method of claim 1, wherein one of the first substrate or second substrate is in area contact with the contact surface.

10. The method of claim 1, wherein the contact surface is a structure that is sufficiently resilient to resist read-through through to an outer surface of the second substrate subsequent to assembly.

11. The method of claim 1, wherein the pre-formed insert includes at least 3 hinges.

12. The method of claim wherein the carrier is defined to include a loop.

13. The method of claim 1, wherein at least one living hinge opens and at least one living hinge closes.

14. The method of claim 1, wherein the pre-installation configuration enables clearance for installation of the second substrate so that the second substrate contacts the contact surface prior to contacting any other portion of the insert.

15. The method of claim 1, wherein a single point of contact causes multiple degrees of movement of the plurality of living hinges.

16. The method of claim 1, wherein the insert forms into the second installed configuration as a result of the first and second surface being brought into contact with one another.

17. The method of claim 1, wherein the plurality of living hinges are free of hinges that extend beyond 180°.

18. The method of claim 1, wherein the contact surface contacts the second surface and is substantially free of any direct contact with the first surface.

19. A pre-formed insert formed for use in the method of claim 1.

20. The pre-formed insert of claim 19, wherein the carrier includes a continuous loop.

* * * * *